(12) United States Patent
Hsu et al.

(10) Patent No.: US 6,870,740 B2
(45) Date of Patent: Mar. 22, 2005

(54) LATCH UNIT FOR AN ELECTRONIC DEVICE

(75) Inventors: Shih-Chung Hsu, Taipei Hsien (TW); Hua-Chung Tseng, Taipei Hsien (TW); Chia-Liang Yen, Taipei Hsien (TW); Chu-Hsian Chian, Taipei Hsien (TW)

(73) Assignees: Wistron Corporation, Taipei Hsien (TW); Acer Inc., Taipei Hsien (TW)

( * ) Notice: Subject to any disclaimer, the term of this patent is extended or adjusted under 35 U.S.C. 154(b) by 0 days.

(21) Appl. No.: 10/734,329

(22) Filed: Dec. 12, 2003

(65) Prior Publication Data

US 2004/0125583 A1 Jul. 1, 2004

Related U.S. Application Data

(63) Continuation of application No. 10/140,416, filed on May 6, 2002, now Pat. No. 6,707,665.

(30) Foreign Application Priority Data

Sep. 7, 2001 (TW) ...................................... 90215441 U

(51) Int. Cl.[7] ................................................ H05K 7/12

(52) U.S. Cl. ........................ 361/732; 361/726; 361/747; 361/759; 361/801; 361/681

(58) Field of Search ................................ 361/726, 732, 361/740, 747, 759, 801, 681, 685; 312/215, 216, 222, 223.1, 223.2, 223.3

(56) References Cited

U.S. PATENT DOCUMENTS

| | | | |
|---|---|---|---|
| 5,205,017 A | | 4/1993 | Wang |
| 5,465,191 A | * | 11/1995 | Nomura et al. ............. 361/681 |
| 6,115,239 A | | 9/2000 | Kim |
| 6,122,152 A | * | 9/2000 | Goto et al. ..................... 361/1 |
| 6,517,129 B1 | * | 2/2003 | Chien et al. ............. 292/251.5 |
| 6,535,380 B1 | * | 3/2003 | Lee et al. ................... 361/683 |
| 6,707,665 B2 | * | 3/2004 | Hsu et al. ................... 361/681 |
| 6,717,804 B1 | * | 4/2004 | Skinner ...................... 361/683 |

FOREIGN PATENT DOCUMENTS

| | | |
|---|---|---|
| CH | 2436624 | 6/2001 |
| JP | 5-216830 | 8/1993 |
| JP | 8-254057 | 10/1996 |
| JP | 2000-255612 | 9/2000 |

* cited by examiner

*Primary Examiner*—Kamand Cuneo
*Assistant Examiner*—Dameon E. Levi
(74) *Attorney, Agent, or Firm*—Ladas & Parry LLP

(57) ABSTRACT

A latch unit is mounted on an electronic device having first and second housings. The latch unit includes a hook member for interlocking the first and second housings. The hook member is mounted in the first housing and has opposite first and second engaging ends. The first engaging end projects from the first housing and extends into and releasably engages the second housing upon movement of the hook member to an engaging position when the first housing is positioned at a first transverse position. The second engaging end projects from the first housing and extends into and releasably engages the second housing upon movement of the hook member to the engaging position when the first housing is positioned at a second transverse position.

11 Claims, 6 Drawing Sheets

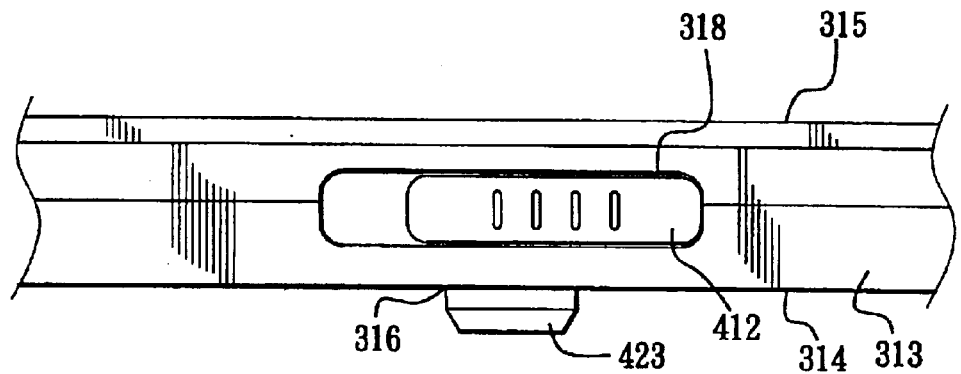
F I G. 5
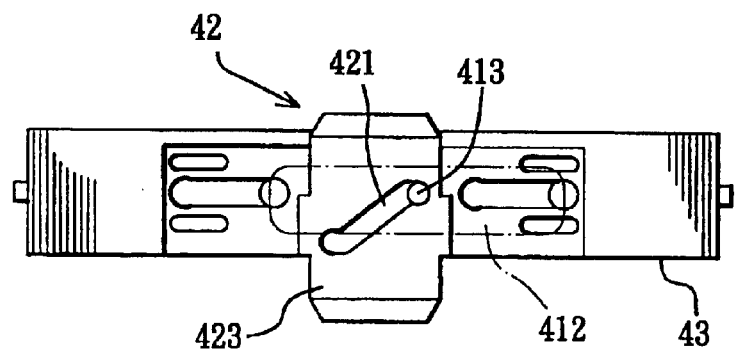
F I G. 6

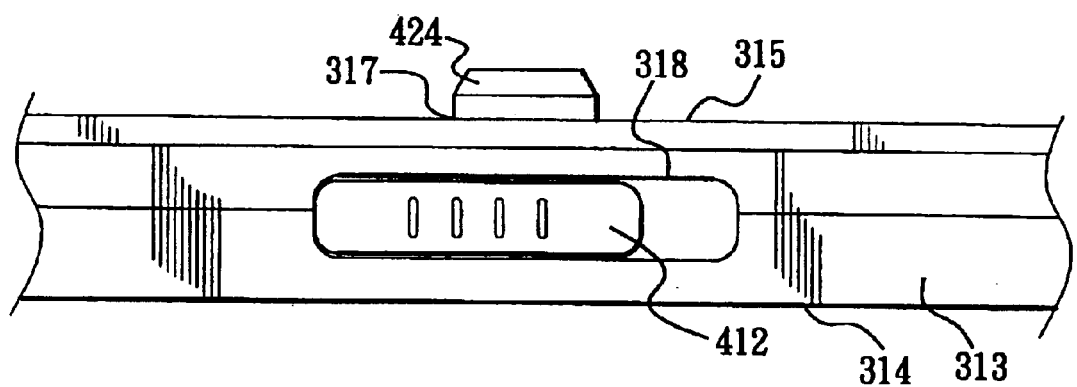
F I G. 7
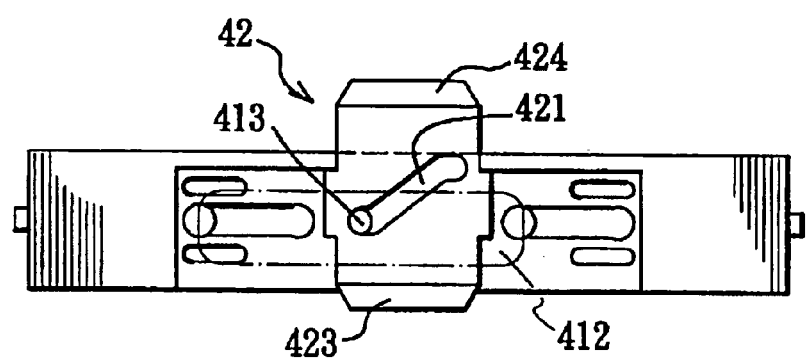
F I G. 8

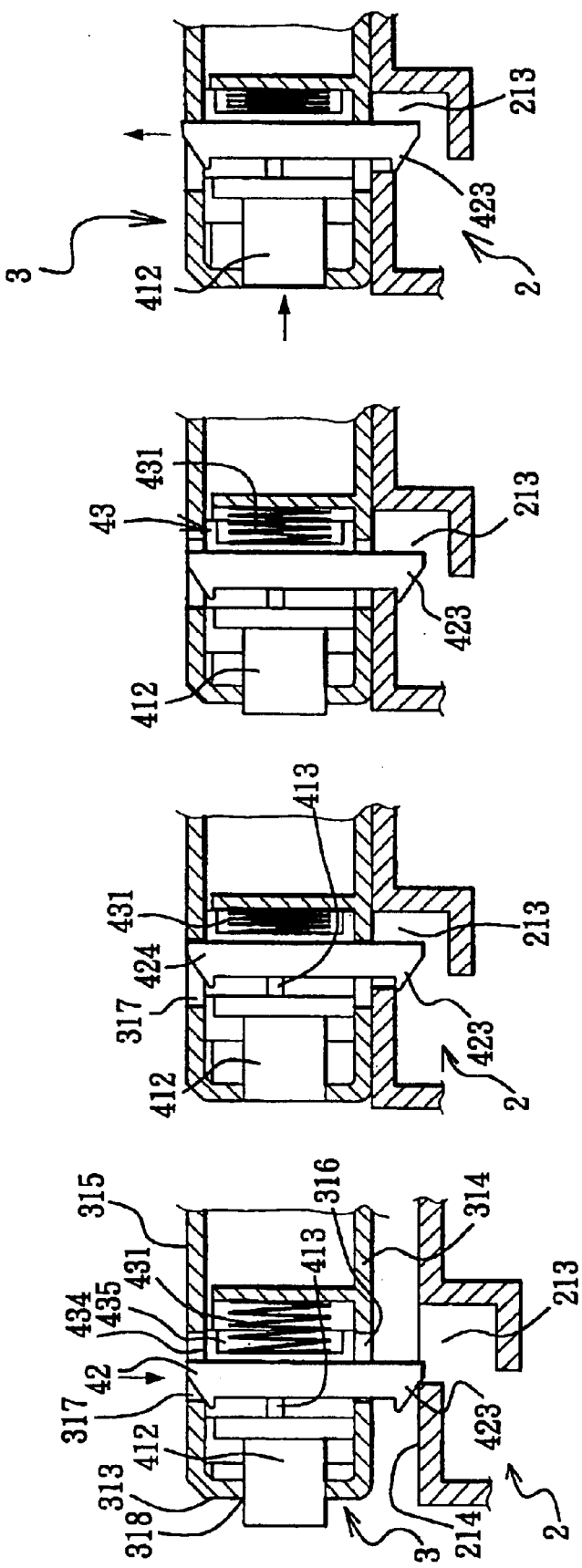

LATCH UNIT FOR AN ELECTRONIC DEVICE

CROSS-REFERENCE TO RELATED APPLICATION

This application is a continuation application of U.S. patent application Ser. No. 10/140,416, filed on May 6, 2002 now U.S. Pat. No. 6,707,665, which claims priority of Taiwan Patent Application No. 90215441, filed on Sep. 07, 2001.

BACKGROUND OF THE INVENTION

1. Field of the Invention

This invention relates to a latch unit for an electronic device, more particularly to a latch unit for locking a display module to a main body of a portable computer.

2. Description of the Related Art

FIG. 1 illustrates a conventional portable computer 7 which includes a display module 71 and a main body 72 pivoted to the display module 71 via a hinge member 73 so as to permit the display module 71 to be rotatable about a vertical axis (Z) and a horizontal axis (X). The display module 71 has front and back walls 713, 714. The display module 71 is provided with a latch means having an anchored protrusion 716 formed on the front wall 713. The main body 72 has an upper wall 722 formed with a slot 723. The anchored protrusion 716 extends into and engages a periphery of the slot 723 when the display module 71 rotates about the horizontal axis (X) to a closed position, thereby locking the display module 71 to the main body 72. The portable computer 7 can be converted into a tablet computer by rotating the display module 71 about the vertical axis (Z) to a position where the back wall 714 of the display module 71 can confront the upper wall 722 of the main body 72 upon rotation of the display module 71 about the horizontal axis (X) to the closed position. The conventional portable computer 7 is disadvantageous in that when in the form of the tablet personal computer, the display module 71 and the main body 72 cannot be locked together.

SUMMARY OF THE INVENTION

Therefore, the object of the present invention is to provide a latch unit for an electronic device that is capable of overcoming the aforementioned drawback.

According to the present invention, there is provided a latch unit for an electronic device that includes first and second housings pivoted to each other. The first housing is formed with opposite first and second slots. The second housing is formed with an upper slot. The first housing is rotatable relative to the second housing about a first axis to a closed position, in which, the first housing is stacked on the second housing. The first housing is rotatable relative to the second housing about a second axis between a first angular position, in which, the first slot confronts and is registered with the upper slot upon movement of the first housing to the closed position, and a second angular position, in which, the second slot confronts and is registered with the upper slot upon movement of the first housing to the closed position. The latch unit includes: a hook member adapted to be mounted movably in the first housing and having opposite first and second engaging ends extending oppositely in a transverse direction relative to the first and second slots, the hook member being movable in the transverse direction between a first transverse position, in which, the first engaging end is adapted to extend through the first slot and into the upper slot when the first housing is simultaneously positioned at the first angular position and the closed position, and a second transverse position, in which, the second engaging end is adapted to extend through the second slot and into the upper slot when the first housing is simultaneously positioned at the second angular position and the closed position; and a hook-controlling member which is adapted to be mounted on the first housing and which is operable for moving the hook member between the first and second transverse positions.

BRIEF DESCRIPTION OF THE DRAWINGS

In drawings which illustrate an embodiment of the invention,

FIGS. 5 and 6 are schematic side views to illustrate a hook member of the latch unit of FIG. 3 when at a first angular position;

FIGS. 7 and 8 are schematic side views to illustrate the hook member of the latch unit of FIG. 3 when at a second angular position;

FIGS. 9 to 11 are sectional views to illustrate consecutive movements of the hook member to an engaging position; and FIG. 12 is a sectional view to illustrate movement of the hook member from the engaging position to a disengaging position.

DETAILED DESCRIPTION OF THE PREFERRED EMBODIMENT

Figure 1:
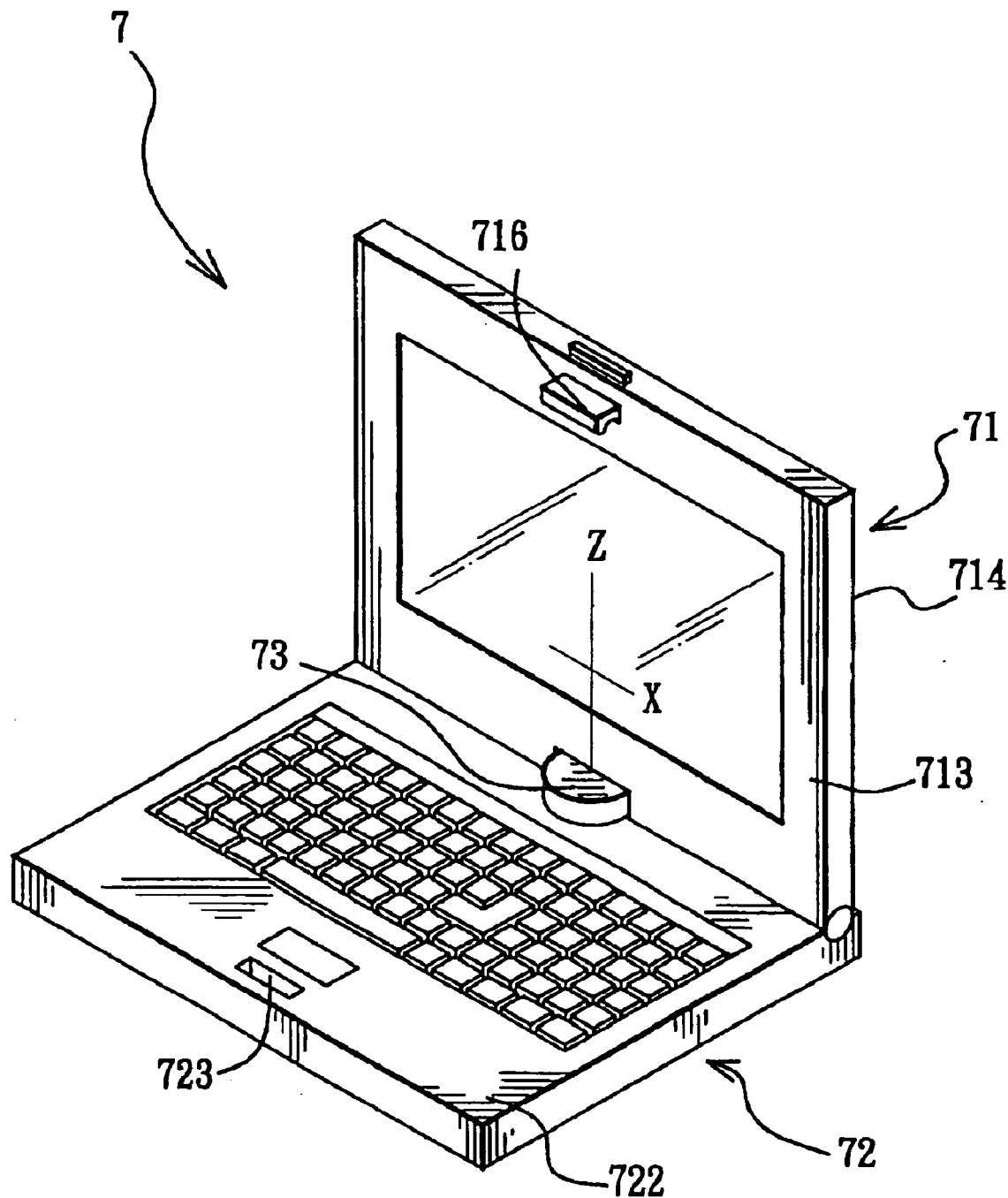
FIG. 1 is a perspective view of a conventional portable computer.
Figure 2:
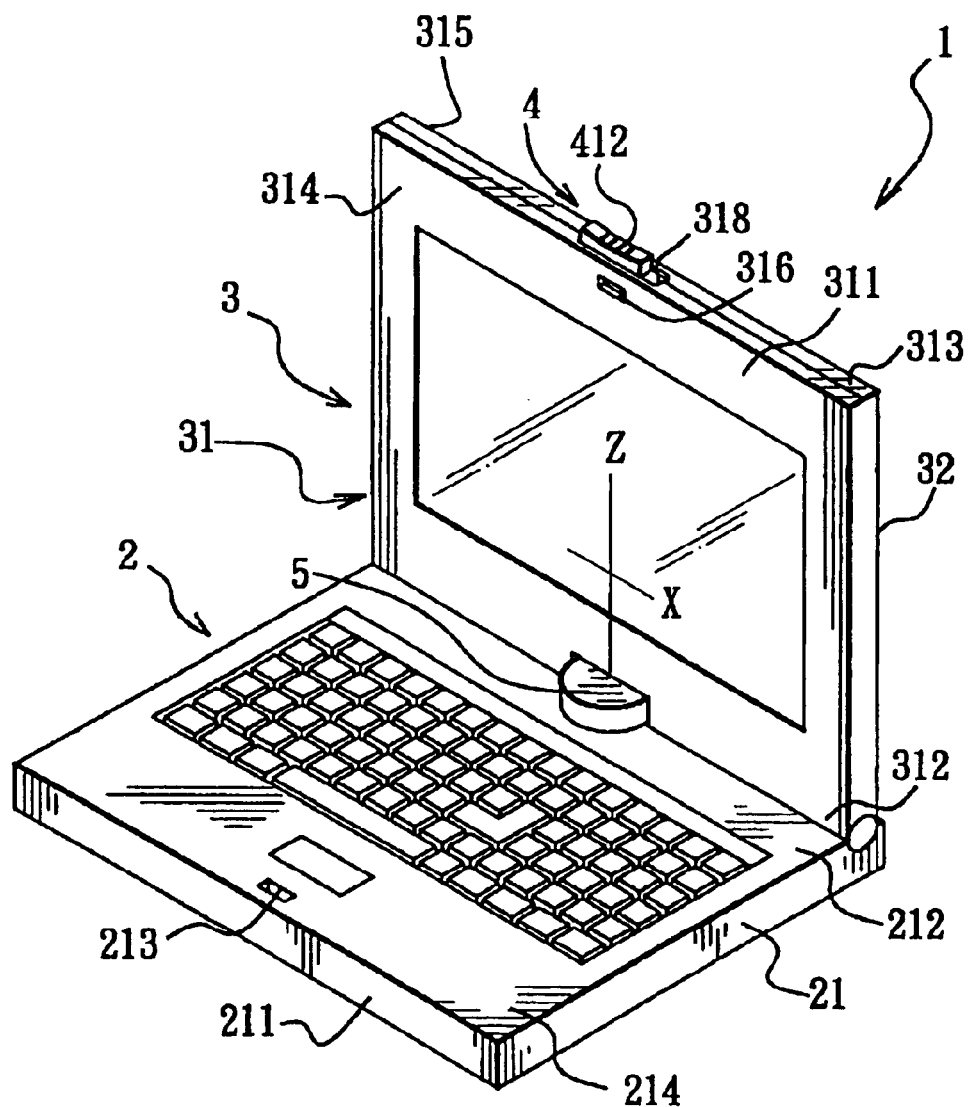
FIG. 2 is a perspective view of a portable computer embodying this invention.
Figure 3:
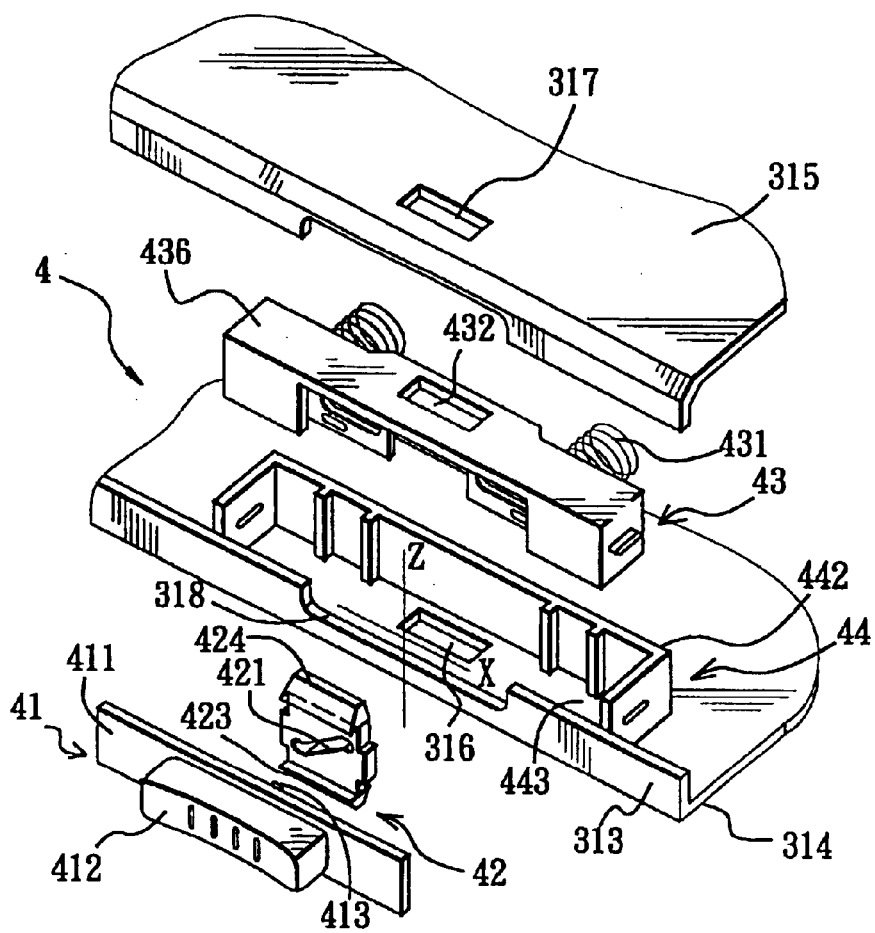
FIG. 3 is an exploded perspective view of a latch unit of the portable computer of FIG. 2.
Figure 4:
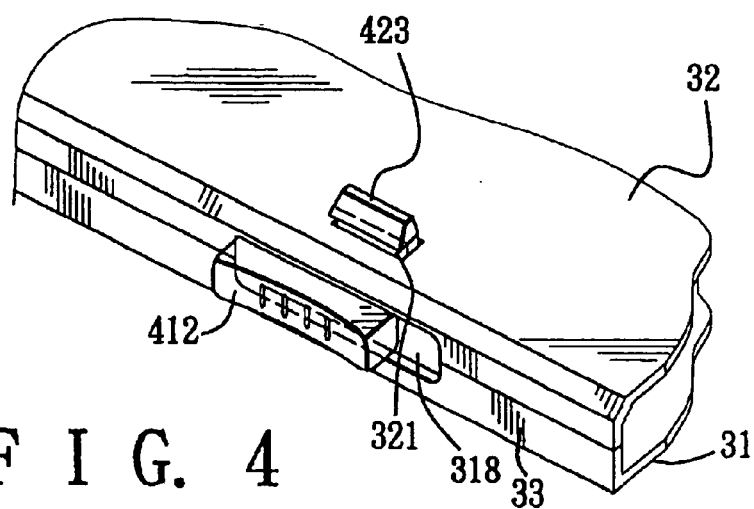
FIG. 4 is a perspective view to illustrate how the latch unit of FIG. 3 is mounted on a display module of the portable computer of FIG. 2.

FIGS. 2 to 6 illustrate a preferred embodiment of an electronic device of this invention. As an example, the electronic device is a portable computer 1 that includes a main body 2, a display module 3, and a latch unit 4.

The display module 3 includes a first housing 31 with opposite first front and rear ends 311, 312 and opposite first and second walls 314, 315 that are respectively formed with first and second slots 316, 317 adjacent to the first front end 311. The first housing 31 further has a front wall 313 interconnecting the first and second walls 314, 315 at the front end 311 of the first housing 31 and formed with an elongated slot 318 adjacent to the first and second slots 316, 317.

The main body 2 includes a second housing 21 with opposite second front and rear ends 211, 212 and an upper wall 214 that is formed with an upper slot 213 adjacent to the second front end 211. The second rear end 212 is pivoted to the first rear end 312 via a known hinge member 5 so as to permit the first housing 31 to be rotatable relative to the second housing 21 about a first axis (X) to a closed position (see FIGS. 10 and 11, in combination with, FIG. 2), in which, the first housing 31 is stacked on the second housing 21, and to permit the first housing 31 to be rotatable relative to the second housing 21 about a second axis (Z) between a first angular position (see FIGS. 5 and 6 in combination with FIG. 2), in which, the first wall 314 confronts the upper wall 214 and the first slot 316 is registered with the upper slot 213 upon movement of the first housing 31 to the closed position, and a second angular position (see FIGS. 7 and 8 in combination with FIG. 2), in which, the second wall 315 confronts the upper wall 214 and the second slot 317 is registered with the upper slot 213 upon movement of the first housing 31 to the closed position.

The latch unit 4 includes: a hook member 42 mounted movably in the first housing 31 and having opposite first and second engaging ends 423, 424 extending oppositely in a transverse direction relative to the first and second walls 314, 315, the hook member 42 being movable in the transverse direction between a first transverse position, in which, the first engaging end 423 extends through the first slot 316 and into the upper slot 213 (see FIGS. 5 and 6) when the first housing 31 is simultaneously positioned at the first angular position and the closed position, and a second transverse position, in which, the second engaging end 424 extends through the second slot 317 and into the upper slot 213 (see FIGS. 7 and 8) when the first housing 31 is simultaneously positioned at the second angular position and the closed position, the hook member 42 being movable in a lateral direction relative to the first housing 31 between an engaging position (see FIG. 11), in which, the first engaging end 423 releasably engages a periphery of the upper slot 213 when the hook member 42 is positioned at the first transverse position, and in which, the second engaging end 424 releasably engages the periphery of the upper slot 213 when the hook member 42 is positioned at the second transverse position, and a disengaging position (see FIG. 12), in which, the first engaging end 423 disengages from the periphery of the upper slot 213 when the hook member 42 is positioned at the first transverse position, and in which, the second engaging end 424 disengages from the periphery of the upper slot 213 when the hook member 42 is positioned at the second transverse position; an urging member 431 for urging the hook member 42 to move to the engaging position; and a hook-controlling member 413 which is operable for moving the hook member 42 between the first and second transverse positions and between the engaging and disengaging positions. FIGS. 9 to 11 illustrate consecutive movements of the hook member 42 to the engaging position and movements of the first housing 31 to the closed position. FIG. 12 illustrates movement of the hook member 42 from the engaging position to the disengaging position.

The hook member 42 is in the form of a plate that has two opposite anchored ends which define the first and second engaging ends 423, 424, respectively. The hook member 42 is formed with an inclined slot 421 that extends inclinedly relative to a horizontal line parallel to the elongated slot 318 between the first and second engaging ends 423, 424. The hook-controlling member 41 includes a button 412 that is mounted movably on an exterior of the first housing 31 and that is registered with the elongated slot 318, and a pushing rod 413 that projects from the button 412 through the elongated slot 318 and into the inclined slot 421 and that slidably engages a periphery of the inclined slot 421 in such a manner that movement of the button 412 along the horizontal line results in concurrent movement of the hook member 42 in the transverse direction between the first and second transverse positions.

A U-shaped partition 44 is mounted securely in the first housing 31, confines a mounting space 443 therein, and has a spring abutting wall 442. A spring retaining member 43 is disposed in the mounting space 443, and has a retaining wall 434 (see FIG. 9) that is disposed between the hook member 42 and the spring abutting wall 442 and that is formed with a spring retaining recess 435 confronting the spring abutting wall 442. The spring retaining member 43 further has a top wall 436 formed with an intermediate slot 432 that is adapted to be disposed between and to register with the first and second slots 316, 317. The hook member 42 extends in the transverse direction through the intermediate slot 432, and contacts the retaining wall 434. The urging member 431 in the form of a coil spring that has one end received in the spring retaining recess 435 and the other end abutting against the spring abutting wall 442 so as to urge the hook member 42 to the engaging position via the spring retaining member 43. The hook member 42 is pushed by the pushing rod 413 to move from the engaging position to the disengaging position when the button 412 is pressed against the urging action of the urging member 431. A retaining plate 411 is secured to the button 412, and is movably anchored at an inner periphery of the elongated slot 318 so as to retain the button 412 on the first housing 31. The retaining plate 411 is in contact with the retaining wall 434 of the spring retaining member 43 so as to push the spring retaining member 43 against the urging member 431 when the button 412 is pressed.

With the inclusion of the latch unit 4 in the portable computer 1, the aforesaid drawback as encountered in the prior art can be eliminated.

With the invention thus explained, it is apparent that various modifications and variations can be made without departing from the spirit of the present invention. It is therefore intended that the invention be limited only as recited in the appended claims.

We claim:

1. A latch unit for an electronic device including first and second housings pivoted to each other, the first housing being formed with a slot, the second housing being formed with an upper slot, the first housing being rotatable relative to the second housing about a first axis to a closed position, in which, the first housing is stacked on the second housing, said latch unit comprising:
   a hook member adapted to be mounted movably in the first housing and having an engaging end extending in a transverse direction relative to said second slot, said hook member being movable in said transverse direction between a first transverse position, in which, said engaging end is adapted to extend through said slot and into the upper slot when the first housing is simultaneously positioned, and a second transverse position, in which, said engaging end is separated from said first housing; and
   a hook-controlling member which is adapted to be mounted on the first housing and which is operable for moving said hook member between said first and second transverse positions.

2. The latch unit of claim 1, wherein said hook member is movable in a lateral direction relative to the first housing between an engaging position, in which, said first engaging end is adapted to releasably engage a periphery of the upper slot when said hook member is positioned at the first transverse position, and in which, said second engaging end is adapted to releasably engage the periphery of the upper slot when said hook member is positioned at the second transverse position, and a disengaging position, in which, said first engaging end disengages from the periphery of the upper slot when said hook member is positioned at the first transverse position, and in which, said second engaging end disengages from the periphery of the upper slot when said hook member is positioned at the second transverse position, said hook-controlling member being pressable for moving said hook member from the engaging position to the disengaging position.

3. The latch unit of claim 2, further comprising an urging member which is adapted to be disposed in the first housing for urging said hook member to the engaging position.

4. The latch unit of claim 3, wherein said hook member is in the form of a plate that has two opposite anchored ends which define said first and second engaging ends, respectively, said hook member being formed with an inclined slot that extends inclinedly relative to a horizontal line between said first and second engaging ends, said hook-controlling member including a button that is adapted to be mounted movably on an exterior of the first housing, and a pushing rod that projects from said button into said inclined slot and that slidably engages a periphery of said inclined slot in such a manner that movement of said button along the horizontal line results in concurrent movement of said hook member in said transverse direction between said first and second transverse positions.

5. The latch unit of claim 4, further comprising a U-shaped partition adapted to be mounted securely in the first housing, confining a mounting space therein, and having a spring abutting wall, said latch unit further comprising a spring retaining member disposed in said mounting space and having a retaining wall that is disposed between said hook member and said spring abutting wall and that is formed with a spring retaining recess confronting said spring abutting wall, said spring retaining member further having a top wall formed with an intermediate slot that is adapted to be disposed between and to register with the first and second slots, said hook member extending in the transverse direction through said intermediate slot and contacting said retaining wall, said urging member being in the form of a coil spring that has one end received in said spring retaining recess and the other end abutting against said spring abutting wall so as to urge said hook member to the engaging position via said spring retaining member, said hook member being pushed by said pushing rod to move from the engaging position to the disengaging position when said button is pressed against the urging action of said urging member.

6. An electronic device, comprising:
first and second housings that are pivoted to each other, the first housing being formed with a slot, the second housing being formed with an upper slot, the first housing being rotatable relative to said second housing about a first axis to a closed position, in which, the first housing is stacked on the second housing;
a hook member mounted movably in the first housing and having an engaging end extending in a transverse direction relative to said slot, said hook member being movable in said transverse direction between a first transverse position, in which, said engaging end is adapted to extend through said slot and into the upper slot when the first housing is simultaneously positioned, and a second transverse position, in which said engaging end is separated from said first housing; and
a hook-controlling member which is adapted to be mounted on the first housing and which is operable for moving said hook member between said first and second transverse positions.

7. The electronic device of claim 6, wherein said hook member is movable in a lateral direction relative to the first housing between an engaging position, in which, said first engaging end is adapted to releasably engage a periphery of the upper slot when said hook member is positioned at the first transverse position, and in which, said second engaging end is adapted to releasably engage the periphery of the upper slot when said hook member is positioned at the second transverse position, and a disengaging position, in which, said first engaging end disengages from the periphery of the upper slot when said hook member is positioned at the first transverse position, and in which, said second engaging end disengages from the periphery of the upper slot when said hook member is positioned at the second transverse position, said hook-controlling member being pressable for moving said hook member from the engaging position to the disengaging position.

8. The electronic device of claim 7, further comprising an urging member which is adapted to be disposed in the first housing for urging said hook member to the engaging position.

9. The electronic device of claim 8, wherein said hook member is in the form of a plate that has two opposite anchored ends which define said first and second engaging ends, respectively, said hook member being formed with an inclined slot that extends inclinedly relative to a horizontal line between said first and second engaging ends, said hook-controlling member including a button that is adapted to be mounted movably on an exterior of the first housing, and a pushing rod that projects from said button into said inclined slot and that slidably engages a periphery of said inclined slot in such a manner that movement of said button along the horizontal line results in concurrent movement of said hook member in said transverse direction between said first and second transverse positions.

10. The electronic device of claim 9, further comprising a U-shaped partition adapted to be mounted securely in the first housing, confining a mounting space therein, and having a spring abutting wall, said latch unit further comprising a spring retaining member disposed in said mounting space and having a retaining wall that is disposed between said hook member and said spring abutting wall and that is formed with a spring retaining recess confronting said spring abutting wall, said spring retaining member further having a top wall formed with an intermediate slot that is adapted to be disposed between and to register with the first and second slots, said hook member extending in the transverse direction through said intermediate slot and contacting said retaining wall, said urging member being in the form of a coil spring that has one end received in said spring retaining recess and the other end abutting against said spring abutting wall so as to urge said hook member to the engaging position via said spring retaining member, said hook member being pushed by said pushing rod to move from the engaging position to the disengaging position when said button is pressed against the urging action of said urging member.

11. A portable computer, comprising:
a display module having a first housing that is formed with a slot;
a main body having a second housing that is formed with an upper slot, said first and second housings being pivoted to each other so as to permit the first housing to be rotatable relative to the second housing about a first axis to a closed position, in which, the first housing is stacked on the second housing;
a hook member adapted to be mounted movably in the first housing and having an engaging end extending in a transverse direction relative to said slot, said hook member being movable in said transverse direction between a first transverse position, in which, said engaging end is adapted to extend through said slot end into the upper slot when the first housing is simultaneously positioned, and a second transverse position, in which, said engaging end is separated from said first housing; and
a hook-controlling member which is adapted to be mounted on the first housing and which is operable for moving said hook member between said first and second transverse positions.

* * * * *